United States Patent
Stockhaus

(10) Patent No.: US 7,267,493 B2
(45) Date of Patent: Sep. 11, 2007

(54) TRANSCEIVER DEVICE

(75) Inventor: Andreas Stockhaus, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 459 days.

(21) Appl. No.: 10/424,021

(22) Filed: Apr. 25, 2003

(65) Prior Publication Data

US 2004/0164871 A1     Aug. 26, 2004

(30) Foreign Application Priority Data

Feb. 25, 2003   (DE)   ................... 103 09 196

(51) Int. Cl.
*G02B 6/36*      (2006.01)
(52) U.S. Cl. .......................... 385/92; 385/88
(58) Field of Classification Search .............. None
See application file for complete search history.

(56) References Cited

U.S. PATENT DOCUMENTS

| | | | |
|---|---|---|---|
| 3,836,938 A * | 9/1974 | Barrett et al. | 439/157 |
| 4,954,928 A | 9/1990 | Jullien | |
| 5,504,656 A | 4/1996 | Joist | |
| 5,668,696 A | 9/1997 | Schmitt | |
| 6,335,869 B1 * | 1/2002 | Branch et al. | 361/816 |
| 6,381,146 B1 * | 4/2002 | Sevier | 361/754 |
| 6,430,053 B1 * | 8/2002 | Peterson et al. | 361/728 |
| 6,789,958 B2 * | 9/2004 | Ahrens et al. | 385/92 |
| 6,840,680 B1 * | 1/2005 | Chiu et al. | 385/53 |
| 6,851,867 B2 * | 2/2005 | Pang et al. | 385/88 |
| 6,943,854 B2 * | 9/2005 | Chiu et al. | 349/53 |
| 2003/0171022 A1 * | 9/2003 | Distad et al. | 439/372 |

FOREIGN PATENT DOCUMENTS

| | | |
|---|---|---|
| DE | 1 262 383 | 3/1968 |
| DE | 43 24 342 A1 | 1/1995 |
| DE | 44 28 529 C1 | 8/1995 |
| DE | 195 23 901 A1 | 1/1997 |

* cited by examiner

*Primary Examiner*—Sung Pak
(74) *Attorney, Agent, or Firm*—Workman Nydegger

(57) ABSTRACT

An apparatus, in particular a transceiver device, for insertion into a receptacle device has at least one connecting element which, when the apparatus is inserted, is placed in contact with at least one corresponding connecting element. This provides improved, user-friendliness of such an apparatus. The apparatus has at least one pivot lever that is pivotably attached to the apparatus in such a way that, by pivoting the pivot lever against the receptacle device, the apparatus can be pushed out of the receptacle device.

21 Claims, 3 Drawing Sheets

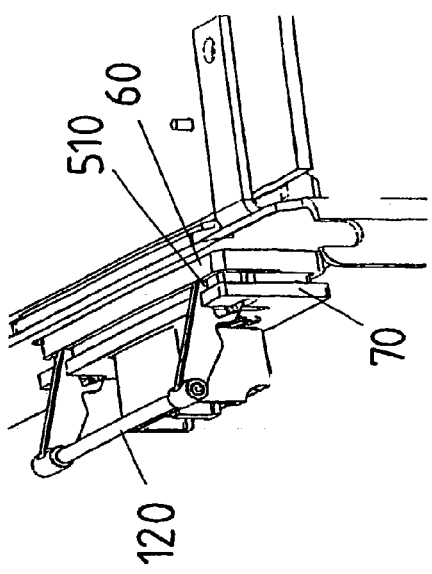
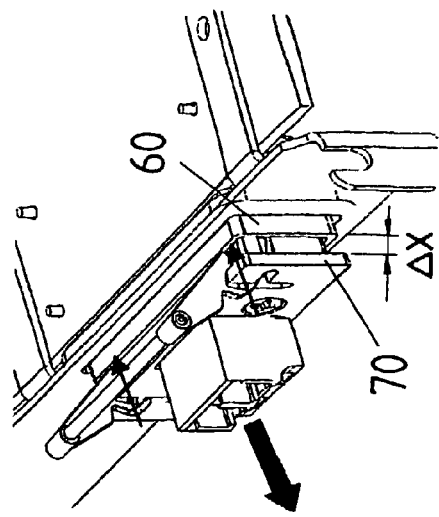
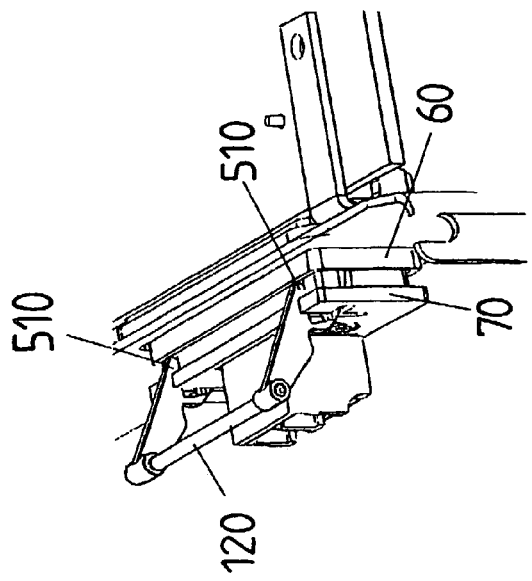

TRANSCEIVER DEVICE

BACKGROUND OF THE INVENTION

Field of the Invention

The invention relates to an electrical and/or optical apparatus, in particular an electro-optical transceiver device, for insertion into a receptacle device having at least one connecting element.

An electrical apparatus of this type is, for example, a car radio that can be removed from the motor vehicle, essentially to protect it against the risk of theft.

SUMMARY OF THE INVENTION

It is accordingly an object of the invention to provide a transceiver device that overcomes the above-mentioned disadvantages of the prior art devices of this general type, which is based on the object of improving an apparatus of the previously known type with respect to its user-friendliness.

With the foregoing and other objects in view there is provided, in accordance with the invention, an apparatus for insertion into a receptacle device having at least one receptacle connecting element. The apparatus contains an apparatus body and at least one connecting element supported by the apparatus body. When the apparatus body has been inserted in the receptacle device, the connecting element is in contact with the receptacle connecting element. At least one pivot lever is pivotably attached to the apparatus body such that, by pivoting the pivot lever against the receptacle device, the apparatus body can be pushed out of the receptacle device.

According to the above, there is provision for the apparatus to have at least one pivot lever that is pivotably attached to the apparatus in such a way that, by pivoting the pivot lever against the receptacle device, the apparatus can be removed from the receptacle device.

A significant advantage of the apparatus according to the invention is that it can be removed from the receptacle device without a relatively large expenditure of force. This is because, by virtue of the pivot lever, the apparatus can be effortlessly removed from the receptacle device—as a function of the dimensioning of the pivot lever—using pivoting laws. The frictional force that is caused in particular by the internal friction of electrical and/or optical connecting elements (for example plugs, sockets, contact springs etc.) is overcome using the pivot lever without a large degree of expenditure of force.

A further significant advantage of the apparatus according to the invention is that the expenditure of force which is necessary to remove the apparatus is, as it were, independent of the number of connecting elements (or "plug elements") which are provided at the apparatus end, as the resulting frictional force is readily overcome by the pivot lever and is therefore hardly perceived as disruptive by an operator when removing the apparatus.

A third significant advantage of the invention relates to the fact that the risk of damage when the apparatus is removed is very low as the user of the apparatus does not have to apply any large mechanical force when pulling it out. In particular it is not necessary to "tug" at the apparatus to pull it out as the pivot lever that is provided according to the invention applies the force that is necessary to push out the apparatus.

As, in particular, the internal frictional forces of the connecting elements bring about a high degree of resistance when the apparatus is pulled out of the receptacle device. It is considered advantageous if the apparatus can be pushed out of the receptacle device by the pivot lever at least to the extent that the connecting elements of the apparatus are separated from the corresponding connecting elements of the receptacle device.

The apparatus can be particularly easily, and thus advantageously, pushed out of the receptacle device if the pivot lever has a supporting arm with a supporting projection that is supported on or braced against the receptacle device when the lever pivots. The supporting projection may be supported or braced against, for example, on a front panel of the receptacle device or a guide frame of the front panel of the receptacle device.

In order to permit the pivot lever to be operated from the outside, it is considered advantageous if the pivot lever has an externally accessible activation arm with which the pivot lever can be pivoted against the receptacle device.

The apparatus preferably has at least two pivot levers that are disposed spaced apart from one another and are connected to one another by an activation element, in particular a rod. If, in fact, at least two pivot levers or more are provided, the apparatus is reliably prevented from "tilting" as it is pushed out of the receptacle device.

The activation arm, together with the at least two pivot levers, preferably forms an activation bar with which the apparatus can be pushed out of the receptacle device and then pulled out.

In order to ensure that the expenditure of force when the apparatus is pushed out of the receptacle device is as low as possible, the activation arm should preferably be longer than the supporting arm. The specific dimensioning of the length of the activation arm and that of the supporting arm results from the lever laws.

An apparatus having at least one optical connecting element and/or at least one electrical connecting element may preferably be an electro-optical apparatus that has at least one electro-optical component, in particular an optical transmitter device and/or an optical receiver device. The apparatus according to the invention is preferably an electro-optical transceiver device.

In particular in the case of apparatuses that have optical and electrical connecting elements, a particularly large application of force is necessary when the apparatus is pulled out of the receptacle device because, in fact, the frictional force of electrical and optical connecting elements has to be overcome. It is therefore considered advantageous if the invention is used in apparatuses with electrical and optical connecting elements, that is to say in apparatuses in which at least one optical connecting element and at least one electrical connecting element are present, and the connecting elements each correspond to at least one corresponding connecting element of the receptacle device.

However, in particular in the case of a transceiver device it may instead also be provided that only the electrical connecting elements of the apparatus correspond to respective connecting elements of the receptacle device and the optical elements of the apparatus are accessible at the front.

In order to optically connect, for example, a transceiver device to one or more optical waveguides, the receptacle device preferably has at least one optical connecting element that is connected to the optical waveguide or guides.

Moreover, it may be considered advantageous if the pivot lever is suitable not only for pushing the apparatus out of the receptacle device but also for releasing the apparatus, before the apparatus is removed from the receptacle device. For this reason, it is considered advantageous if the pivot lever is configured in such a way that it can be used to release the apparatus in the receptacle device. For this purpose, the pivot lever preferably has at least one release element.

Other features which are considered as characteristic for the invention are set forth in the appended claims.

Although the invention is illustrated and described herein as embodied in a transceiver device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5B, 6B, 7, 8 and 9 are bottom, perspective views of the apparatus according to the invention.

DESCRIPTION OF THE PREFERRED EMBODIMENTS

Figure 1:
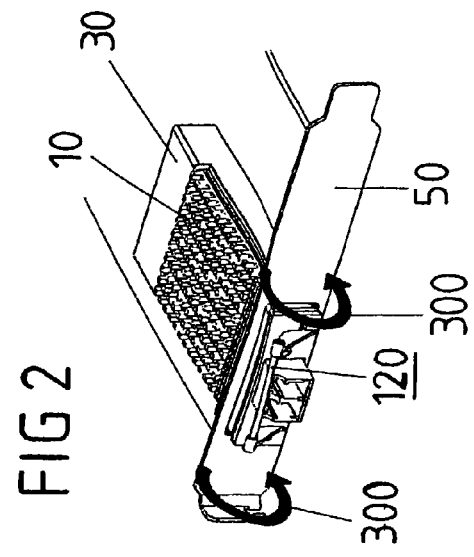
FIGS. 1, 2, 3, 4, 5A and 6A are top, perspective views of an apparatus which can be inserted into a receptacle device according to the invention.

Referring now to the figures of the drawing in detail and first, particularly, to FIG. 1 thereof, there is shown a transceiver device 10 (as an electrical apparatus) which can be inserted into a receptacle device 30 in the direction of an arrow 20. The receptacle device 30 has, inter alia, a frame part 40 and a front panel 50 with a guide frame 60.

The transceiver device 10 is provided with an apparatus front panel 70 to which two pivot levers 80 and 90 are attached so as to be capable of pivoting about a pivot axis 100. Instead of the two pivot levers 80 and 90 being attached to the front panel 70 of the apparatus, they may also be attached to other parts of the apparatus 10. The two pivot levers 80 and 90 are connected to one another by an activation element that is embodied as a rod 110. The two pivot levers 80 and 90 and the rod 110 form an activation bar 120 for the apparatus 10.

At a rear 125 of the apparatus opposite the front panel 70 of the apparatus, the transceiver device 10 has electrical and/or optical connecting elements 131. The electrical and/or optical connecting elements 131 of the transceiver device 10 correspond to respective electrical and/or optical connecting elements 130 in the receptacle device 30.

If the transceiver device 10 is pushed into the receptacle device 30 in the direction of the arrow 20, the connecting elements 131 of the transceiver device 10 are thus placed in contact—electrically and/or optically—with their corresponding counterparts 130 on the receptacle device 30.

An explanation will now be given of how the bar 120 is used to pull out the transceiver device 10 from the receptacle device 30 with reference to the FIGS. 2 to 9.

Figure 2:
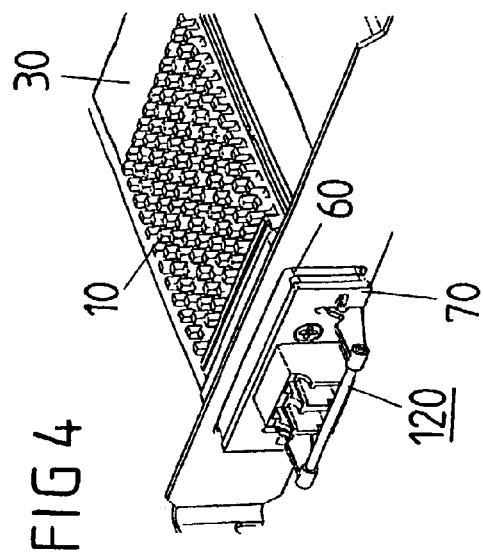
Figure 3:
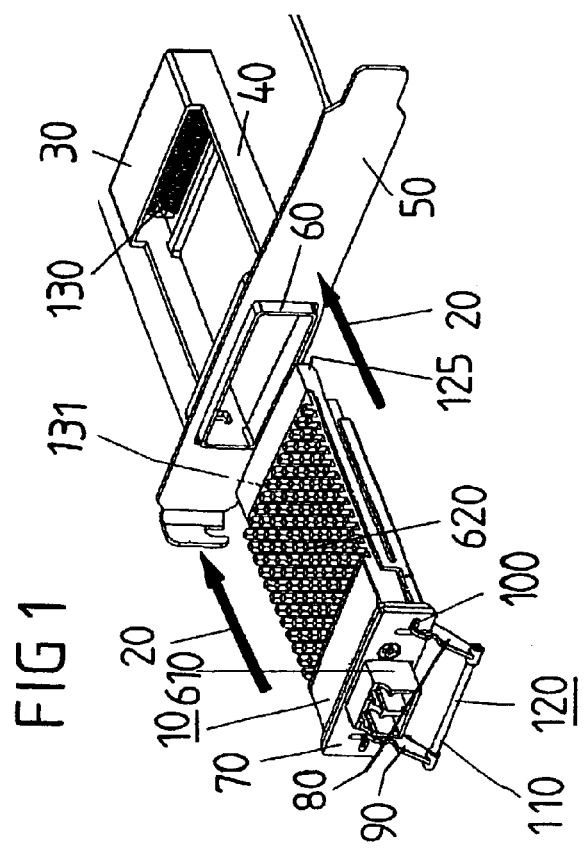
Figure 4:
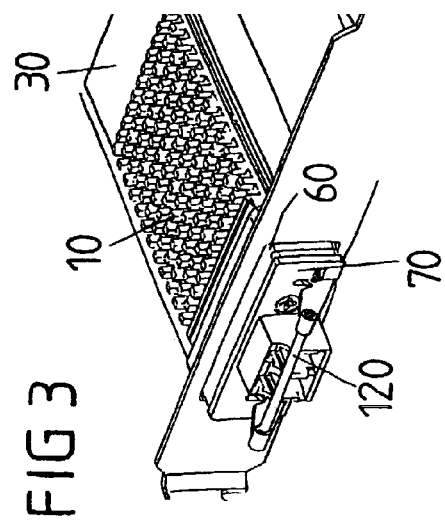

FIG. 2 shows the transceiver device 10 in the receptacle device 30, which is to say after the transceiver device 10 has been inserted into the receptacle device 30 in the direction of the arrow 20.

In order to ensure that the transceiver device 10 is held firmly in the receptacle device 30, the transceiver device 10 is locked in the receptacle device 30. Owing to the locking, the transceiver device 10 cannot readily be pulled out of the receptacle device 30. The locking device which is present for locking the transceiver device 10 in the receptacle device are not illustrated in the figures for the sake of clarity.

The two arrows 300 in FIG. 2 signify how the bar 120 has to be pivoted to enable the transceiver device 10 to be removed from the receptacle device 30.

Figure 5A:
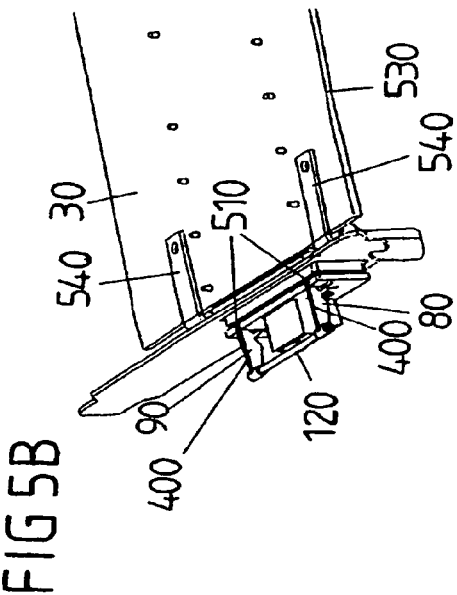
Figure 6A:
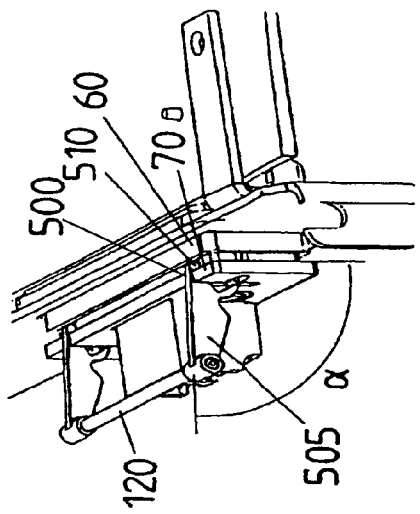

FIGS. 3, 4, 5A and 5B show the movement sequence which the bar 120 carries out as it is pivoted downward. In FIG. 5A, a lower edge 400 of the two pivot levers 80 and 90 is aligned with the longitudinal direction of the transceiver device 10, which is indicated in FIG. 5A by an arrow 410.

As soon as the bar 120 has reached the position illustrated in FIG. 5A, the locking device of the receptacle device 30 is released by the bar 120 in such a way that, by pulling on the bar 120, it would then be possible to pull out the transceiver device 10 from the receptacle device 30. However, owing to the frictional forces of the electrical and/or optical connecting elements 131 of the transceiver device 10 and of the corresponding electrical and/or optical connecting elements 130 of the receptacle device 30 a considerable pulling force would be necessary when the transceiver device 10 was pulled out of the receptacle device 30, specifically a pulling force would be required which overcame the internal frictional forces of the connecting elements 130, 131.

The two pivot levers 80 and 90 are provided in order to simplify the user-friendliness when the transceiver device 10 is pulled out of the receptacle device 30. The two pivot levers 80 and 90 each have a supporting arm 500 and an activation arm 505 (see FIGS. 5B, 6B). The activation arm 505 is connected to the rod 110 and is separated from the supporting arm 500 by the pivot axis 100. The supporting arm 500 has, at its end facing away from the pivot axis 100, a supporting projection 510 which, when the activation arm 505 and the supporting arm 500 pivot, is supported on the guide frame 60 of the front panel 50 and pushes the transceiver device 10 out of the receptacle device 30.

Figure 5B:
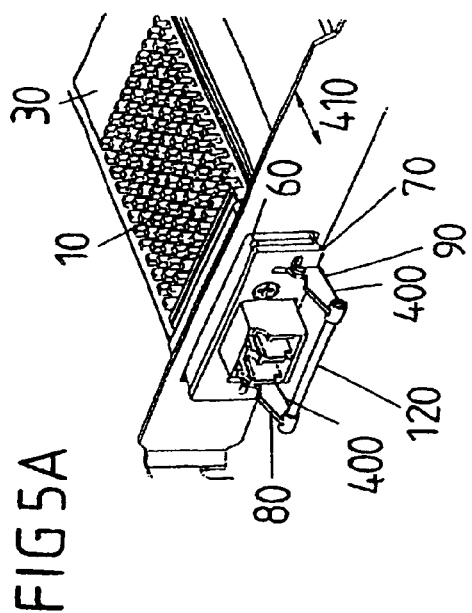
Figure 6B:
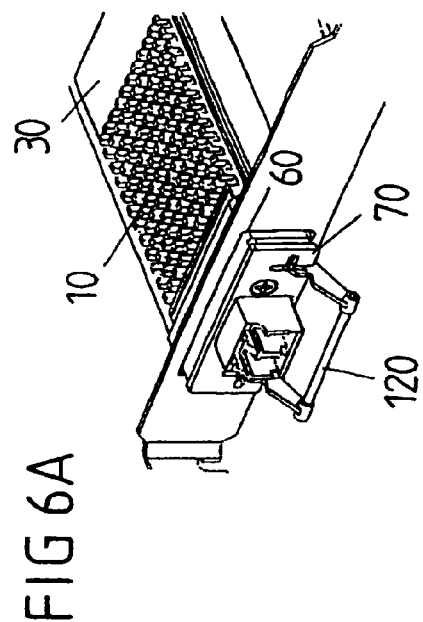

The supporting arm 500 and the supporting projection 510 are illustrated in detail in FIG. 6B; the pushing-out process is shown clearly in FIGS. 5B, 6B, 7, 8 and 9.

FIG. 5B shows the transceiver device 10 and the receptacle device 30 from the rear. FIG. 5B shows that the receptacle device 30 has a base plate 530 that is connected to the front panel 50 of the receptacle device 30 via attachment angles or attachment clips 540. The base plate 530 may be formed for example by a printed circuit board; this may be for example a PCI board.

As is shown in FIGS. 5A and 5B, the supporting projections 510 of the two pivot levers 80 and 90 each touch the guide frame 60 of the receptacle device 30. If the bar 120 is then further pivoted in the direction of the arrow 300 (angle α according to FIG. 6B), as is shown for example in FIGS. 6A and 6B, the supporting projections 510 of the two pivot levers 80 and 90 are pressed against the guide frame 60 owing to the pivoting movement, causing the front panel 70 of the transceiver device 10 to be pressed away by the guide frame 60 of the front panel 50. In other words, the transceiver device 10 is pushed out of the receptacle device 30 by the bar 120 pivoting.

The process in which the transceiver device 10 is pushed out of the receptacle device 30 by pivoting the bar 120 is also shown in detail in FIGS. 7, 8 and 9. From FIGS. 7, 8 and 9 it is apparent that when the bar 120 is pivoted further in the direction of the arrow 300, the front panel 70 is increasingly separated from the guide frame 60 of the front panel 50 by the supporting projections 510 of the two pivot levers 80 and

90. The apparatus is pushed out by approximately 2 mm at a pivoting angle of approximately 60°.

The supporting projections 510 of the two pivot levers 80 and 90 are dimensioned here in such a way that by pivoting the bar 120 the electrical and/or optical connecting elements of the transceiver device 10 are separated from their corresponding "counterparts" on the receptacle device 30 so that after the bar 120 pivots into the lower limit position (see FIG. 9), the connecting elements of the transceiver device 10 and those of the receptacle device 30 are completely separated from one another (reference Δx), and the transceiver device 10 can then be readily pulled out of the receptacle device 30— that is to say without expending a large amount of force.

The transceiver device 10 has a multiplicity of lasers as optical transmitter devices and a multiplicity of photodiodes as optical receiver devices 620 so that the multiplicity of connecting elements 131, which correspond to a respective multiplicity of connecting elements 130 in the receptacle device 30, is correspondingly present at the rear 125 of the transceiver device 10. Owing to the multiplicity of connecting elements, a very large force is necessary to push out the transceiver device 10 from the receptacle device 30, but this force can be easily overcome with the bar 120.

In the transceiver device 10, the electrical connecting elements 131 are disposed, for example, at the rear 125 of the apparatus, while the optical connecting elements of the transceiver device 10 are, for example, disposed exclusively on the apparatus front panel 70 (reference symbol 610). For example, one or more optical waveguides can be connected to the front optical connecting elements 610.

However, both the electrical and optical connecting elements of the transceiver device 10 could instead be disposed at the rear 125 of the apparatus and correspond to the connecting elements 130 in the receptacle device 30. In this case, when the bar 120 was pivoted, both the electrical and optical connecting elements of the transceiver device 10 would be separated from the connecting elements 130 of the receptacle device 30.

I claim:

1. An electro-optical apparatus for insertion into a receptacle device having at least one receptacle connecting element, the electro-optical apparatus comprising:
    an apparatus body;
    at least one connecting element supported by said apparatus body, and when said apparatus body has been inserted in the receptacle device, said connecting element being in contact with the receptacle connecting element; and
    at least one pivot lever pivotably attached to said apparatus body such that, by pivoting said pivot lever against the receptacle device, said apparatus body can be pushed out of the receptacle device, the at least one pivot lever being configured to support a force applied to fully remove the electro-optical apparatus from the receptacle.

2. The electro-optical apparatus according to claim 1, wherein said apparatus body can be pushed out of the receptacle device at least to an extent that said connecting element is separated from the receptacle connecting element of the receptacle device.

3. The electro-optical apparatus according to claim 1, wherein said pivot lever has a supporting arm with a supporting projection which, when said pivot lever pivots, is braced against the receptacle device.

4. The electro-optical apparatus according to claim 3, wherein said pivot lever has an activation arm accessible from an outside and with which said pivot lever can be pivoted against the receptacle device.

5. The electro-optical apparatus according to claim 4, wherein said activation arm is longer than said supporting arm.

6. The electro-optical apparatus according to claim 1, further comprising an activation element, and said pivot lever is one of at least two pivot levers disposed spaced apart from one another and are connected to one another by said activation element.

7. The electro-optical apparatus according to claim 6, wherein said activation element, together with said two pivot levers, forms an activation bar.

8. The electro-optical apparatus according to claim 1, further comprising at least one electro-optical component disposed on said apparatus body.

9. The electro-optical apparatus according to claim 8, wherein the apparatus is an electro-optical transceiver device.

10. The electro-optical apparatus according to claim 1, wherein said connecting element includes at least one electrical connecting element and at least one optical connecting element.

11. The electro-optical apparatus according to claim 1, wherein the receptacle device has at least one optical connecting element for connecting to an optical waveguide.

12. The electro-optical apparatus according to claim 1, wherein said pivot lever is configured in such a way that said pivot lever can be used to release said apparatus body from the receptacle device.

13. The electro-optical apparatus according to claim 12, wherein said pivot lever has a release element.

14. The electro-optical apparatus according to claim 1, wherein said apparatus body has a front panel and at least one optical connecting element disposed on said front panel.

15. The electro-optical apparatus according to claim 1, wherein:
    the receptacle element has a front panel; and
    said pivot lever has a supporting arm with a supporting projection which, when said pivot lever pivots, is braced against the front panel of the receptacle device.

16. The electro-optical apparatus according to claim 1, wherein:
    the receptacle element has a guide frame; and
    said pivot lever has a supporting arm with a supporting projection which, when said pivot lever pivots, is braced against the guide frame of the receptacle device.

17. The electro-optical apparatus according to claim 1, further comprising at least one electro-optical component selected from the group consisting of optical transmitter devices and optical receiver devices, said electro-optical component supported by said apparatus body.

18. An electro-optical transceiver, comprising:
    a transceiver body configured to be removably received by a receptacle device; and
    at least one pivot lever attached at least indirectly to the transceiver body, a portion of the at least one pivot lever being arranged for operable contact with the receptacle device, and the at least one pivot lever being movable between first and second positions, such that:
        movement of the at least one pivot lever to the first position corresponds with achievement of a first state where the transceiver body is unlocked from the receptacle device; and
        movement of the at least one pivot lever to the second position corresponds with achievement of a second state where the transceiver body is partially pushed out of the receptacle device.

19. The electro-optical transceiver as recited in claim 18, wherein the at least one pivot lever comprises a pair of pivot levers, the pivot levers being joined together by a bar such that the pivot levers are configured to move in unison.

20. The electro-optical apparatus according to claim 1, wherein the electro-optical device is a transceiver.

21. An electro-optical apparatus for insertion into a receptacle device having at least one receptacle connecting element, the electro-optical apparatus comprising:

an apparatus body;

at least one connecting element supported by said apparatus body, and when said apparatus body has been inserted in the receptacle device, said connecting element being in contact with the receptacle connecting element; and a pivot lever assembly including at least two pivot levers pivotably attached to the apparatus body and an activation arm connected to the at least two pivot levers, the pivot lever assembly being configured to push the electro-optical apparatus out of the receptacle.

* * * * *